United States Patent [19]

Girguis

[11] Patent Number: 5,474,500
[45] Date of Patent: * Dec. 12, 1995

[54] MOTOR-VEHICLE CONSTANT-VELOCITY JOINT

[76] Inventor: Sobhy L. Girguis, Magdalenenstrasse 19, 5210-Troisdorf 14, Germany

[*] Notice: The portion of the term of this patent subsequent to Nov. 8, 2011, has been disclaimed.

[21] Appl. No.: 274,914

[22] Filed: Jul. 14, 1994

Related U.S. Application Data

[63] Continuation of Ser. No. 822,465, Jan. 17, 1992, Pat. No. 5,362,275.

[30] Foreign Application Priority Data

Jan. 24, 1991 [DE] Germany ............ 41 02 001.4

[51] Int. Cl.⁶ ............................................. F16D 3/205
[52] U.S. Cl. .................... 464/111; 464/124; 464/132; 464/905
[58] Field of Search ............................ 464/111, 123, 464/124, 132, 905

[56] References Cited

U.S. PATENT DOCUMENTS

| | | | |
|---|---|---|---|
| 3,748,869 | 7/1973 | Orain | 464/132 |
| 4,379,706 | 4/1983 | otzuka | 464/111 |
| 4,775,355 | 10/1988 | Mizukoshi | 464/111 |
| 4,978,325 | 12/1990 | Mizukoshi | 464/111 |

FOREIGN PATENT DOCUMENTS

| | | |
|---|---|---|
| 0279127 | 8/1988 | European Pat. Off. . |
| 2234236 | 7/1973 | Germany ............ 464/132 |
| 63-57822 | 4/1988 | Japan . |
| 2188701 | 10/1987 | United Kingdom . |
| 2226102 | 6/1990 | United Kingdom . |
| 90/06451 | 7/1990 | WIPO . |

Primary Examiner—Daniel P. Stodola
Assistant Examiner—Eileen A. Dunn
Attorney, Agent, or Firm—Herbert Dubno; Andrew Wilford

[57] ABSTRACT

A constant-velocity joint has an outer member formed centered on an axis with three radially inwardly open and axially extending channels each having a pair of angularly confronting and axially extending inner running surfaces that are each concave toward the other inner running surface of the respective pair, an inner member formed centered on a respective axis with three radially outwardly projecting trunnions each engaged in a respective one of the channels and each defining respective radially extending trunnion axes, and respective annular rollers rotatable on the trunnions about the respective trunnion axes and having outer running surfaces riding on the inner running surfaces of the respective channels and each radially outwardly convex relative to the respective trunnion axis. One of each of the inner and outer running surfaces is formed with a central noncontact strip offset away from the respective running surface it engages so that the outer and inner running surfaces only engage each other to either side of the strip. In addition each outer running surface is axially fixed relative to the respective trunnion axis and each of the rollers is formed at the respective outer surface as a single unitary piece.

6 Claims, 6 Drawing Sheets

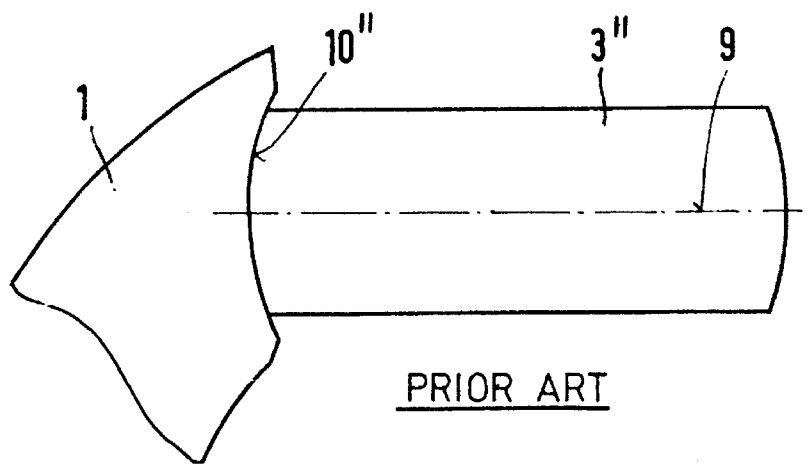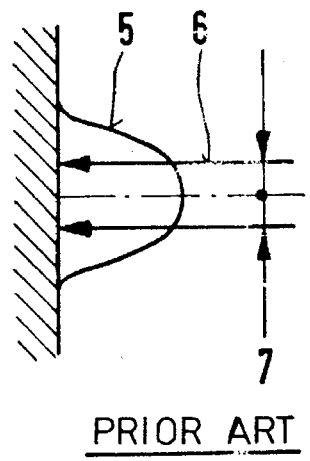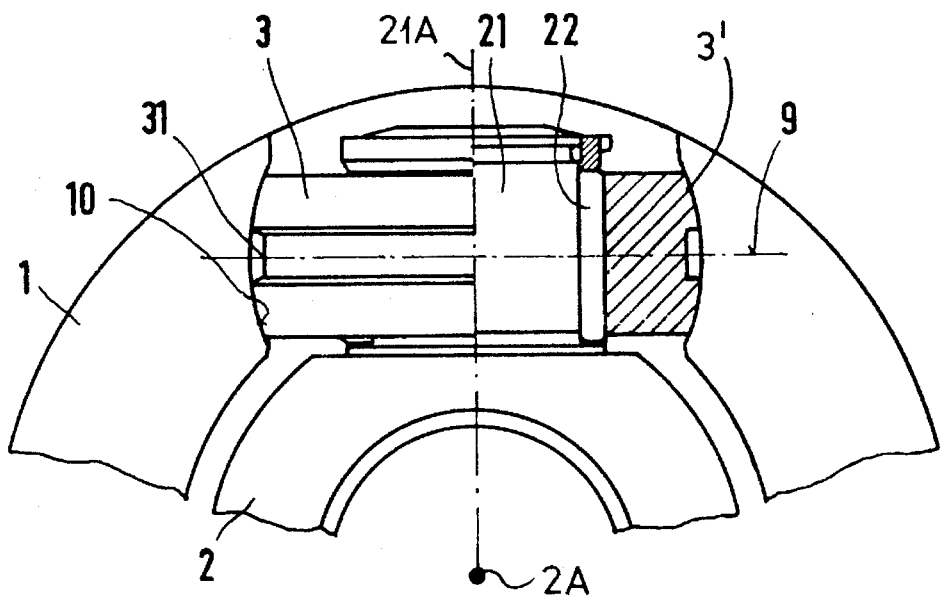

5,474,500

MOTOR-VEHICLE CONSTANT-VELOCITY JOINT

CROSS REFERENCE TO RELATED APPLICATIONS

This application is a continuation of application 07,822,465 filed 17 Jan. 1992 (now U.S. Pat. No. 5,362,275) with a claim to the priority of German application P 41 02 001.4 filed 24 Jan. 1991.

FIELD OF THE INVENTION

The present invention relates to a constant-velocity joint. More particularly this invention concerns such a joint used in the drive train of an automotive vehicle.

BACKGROUND OF THE INVENTION

A known constant velocity joint comprises an outer part formed centered on an axis with three radially inwardly open and axially extending channels each having a pair of angularly confronting and axially extending inner running surfaces or tracks that are each concave toward the other inner running surface of the respective pair, an inner part formed centered on a respective axis with three radially outwardly projecting trunnions each engaged in a respective one of the channels and defining respective radially extending trunnion axes, and respective annular rollers rotatable on the trunnions about the respective trunnion axes and having outer running surfaces riding on the inner running surfaces of the respective channels and each radially outwardly convex relative to the respective trunnion axis. On rotation of the joint with the inner and outer members relatively angled, the rollers move along the tracks with a superimposed pivotal moment which gives rise to track friction. The track friction essentially consists of two components, the track friction force due to the linear movement of the rollers and the frictional movement of the bore friction due to the pivotal movement.

The combined frictional forces of all three rollers result in a periodic axial force of third order. If the joint is used in, for example, the drive train of a vehicle, undesired vibrations or shocks are caused by the periodic axial forces, which are also called shaking forces. The axial force of the bore friction acts in opposite direction to the shaking forces, such that if the bore friction is increased the resultant shaking forces are reduced.

For optimizing travel smoothness, easy movement of a joint is, in some circumstances, at least as important as reducing the shaking forces. The easier the movement of the joint, the better the insulation of the vibrations emanating from, for example, the vehicle engine. Even when there is no transmission of torque through the joint, the easy movability of the joint with the vehicle stationary is important, as the joint provides a measure of insulation of the shaking caused by the running engine.

In German patent document 2,157,372 there is disclosed a joint in which each roller consists of two halves urged apart radially of the Joint and against the track flanks by means of a spring. In the case of higher levels of torque, the roller halves are rigidly interconnected, in which case line contact with a short interruption is present.

German patent document 2,234,236 discloses a similar joint construction in which two-point contact at higher torque values occurs as a result of modification of at least one outline of the contact surfaces. In a further construction, a longitudinal groove is provided in the roller track. This serves to prevent excessive pressure on the inward acute-angled edges of the roller halves and to ensure free pivotal mobility of the roller.

The division of each roller into two relatively rotatable halves can lead to appreciable reduction in bore friction and thereby to an increase in the shaking forces or at least to an unstable behavior thereof. The pivotal movement of the roller is translated not into an opposite sliding on the track flanks, but into a relative rotation of the roller halves in the manner of a slipping clutch so that only slight bore friction is produced. The force component urging the roller halves together is appreciably less than the normal transmission force between the roller halves and the track flanks. Moreover, the lever arm, which comes into effect on the relative rotation of the roller halves, of this slipping-clutch system is smaller than that of the track flanks, and an undesired build-up of heat also results from relative rotation of the two halves.

The division of the roller, which is the source of inaccuracies and additional costs, is thus disadvantageous in these forms of construction. In addition, with respect to the condition in which no or only low torque is transmitted through the joint, the four-point contact between each roller and its track results in undesired stiff movement of the joint.

The conformity of the point contact, which occurs at higher torque values in the joint according to the above-mentioned German patent document 2,234,236, is decisively lower by comparison with the conformity of a line contact. Surface pressure is thereby significantly higher and wear and service life appreciably worse. The formation of a separating lubricant film is reduced, the values of the track friction increased and the easy movability of the joint is diminished.

OBJECTS OF THE INVENTION

It is therefore an object of the present invention to provide an improved constant-velocity joint.

Another object is the provision of such an improved constant-velocity Joint which overcomes the above-given disadvantages, that is which transmits no significant vibration while still transmitting torque from the drive side to the driven side.

SUMMARY OF THE INVENTION

A constant-velocity joint according to the invention has an outer member formed centered on an axis with three radially inwardly open and axially extending channels each having a pair of angularly confronting and axially extending inner running surfaces that are each concave toward the other inner running surface of the respective pair, an inner member formed centered on a respective axis with three radially outwardly projecting trunnions each engaged in a respective one of the channels and each defining respective radially extending trunnion axes, and respective annular rollers rotatable on the trunnions about and slidable along the trunnions along the respective trunnion axes and having outer running surfaces riding on and pivotal relative to the inner running surfaces of the respective channels and each radially outwardly convex relative to the respective trunnion axis. In accordance with the invention one of each of the inner and outer running surfaces is formed with a central noncontact strip offset away from the respective running surface it engages so that the outer and inner running surfaces only engage each other to either side of the strip at least in an oblique position of the respective roller relative to the respective inner running surfaces. In addition each outer running surface is of a radius of curvature at most equal to a radius of curvature of the respective inner running surfaces and each of the rollers is formed at the respective outer surface as a single unitary piece.

One-piece rollers are more stable, more accurately shaped and less costly to produce than divided rollers and unstable behavior of the bore friction can be avoided. For the case when there is no torque transmission through the joint, any mechanical friction can be such as to favor easy movability through the provision of diametral play of the rollers in the tracks. Due to the line contact, a favorable conformity is achieved with low values of the track friction even when the contact length is shortened by the flattening of each roller or recessing of its track. When the contact line is halved, the thickness of the separating lubricant film, for example, is reduced merely by about 10%. On the other hand, the entire length of the line contact can be compensated for within wide limits or even increased through an increase in the width of the rollers or the tracks. Low values of the track friction are preferred to high values, since it is not the increase in the friction values as such that matters, but the increase in the bore friction, preferably at low friction values, not least because of the easy movability of the joint.

According to further features of the invention the noncontact strip has an axial dimension equal generally to about one-third of an axial dimension of the outer running surfaces. This noncontact strip is constituted as a groove.

Furthermore in accordance with the invention each outer running surface has a radius of curvature that is smaller than a radial distance between the outer running surface and the respective trunnion axis. More particularly the outer running surfaces are each of a radius of curvature at most equal to a radius of curvature of the respective inner running surfaces. Each outer running surface can be shaped as part of an ellipsoid.

Each roller can according to the invention include an inner part rotatable and axially fixed on the respective trunnion and an outer part having an outer surface forming the respective outer running surface and an inner surface engaging and slidable along the trunnion axis on the respective inner part. The inner surface of the outer part is radially inwardly convex so that the outer part can rock limitedly on the inner part.

BRIEF DESCRIPTION OF THE DRAWING

The above and other objects, features, and advantages will become more readily apparent from the following, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIG. 1 is an axial end view of a prior-art joint;

FIG. 1a is a force diagram of the system of FIG. 1;

FIGS. 2 and 3 are partly sectional axial end views of two joints according to the invention;

SPECIFIC DESCRIPTION

Figure 3:
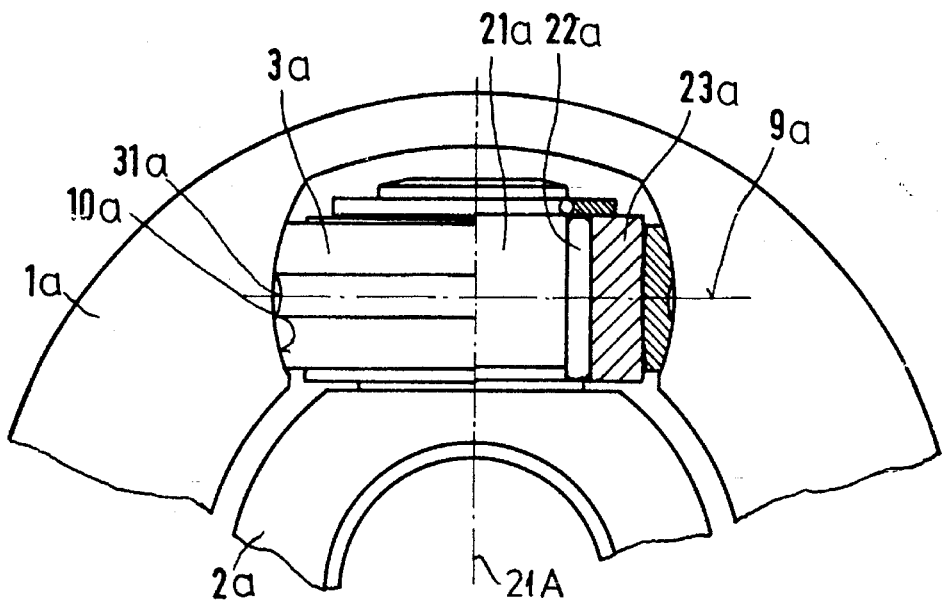

FIG. 1 shows a classical couple of a ball roller 3" of an inner member (not illustrated) with a part-cylindrical track 10" of an outer member 1" in a conventional constant velocity joint, wherein the radius of curvature of the track 10" is slightly smaller than the radius of curvature of the outer running surface of the roller 3", it being noted that the differences in radii of curvature are too small to be visible in this and the below-discussed figures. FIG. 1a shows a typical distribution of the surface pressure 5 of the couple of FIG. 1, wherein the maximum pressure occurs at the crown or symmetry plane 9 of the roller 3". Consequently, the effective radius 7 of the effective forces 6 of the bore friction remains relatively small. Correspondingly, the frictional moment is low and the periodic axial force is high.

FIG. 2 shows part of a first joint embodying the invention. Part-cylindrical tracks 10 are provided in the outer member 1 and the member 2 has three trunnions 21 (only one illustrated) extending radially along respective trunnion axes 21A from an inner member axis 2A. Each trunnion 21 carries a respective part-spherical roller 3 whose outer running surface 3' is formed with a circumferential groove 31 and rotatable on the respective trunnion 21 on needle bearings 22.

Figure 3A:
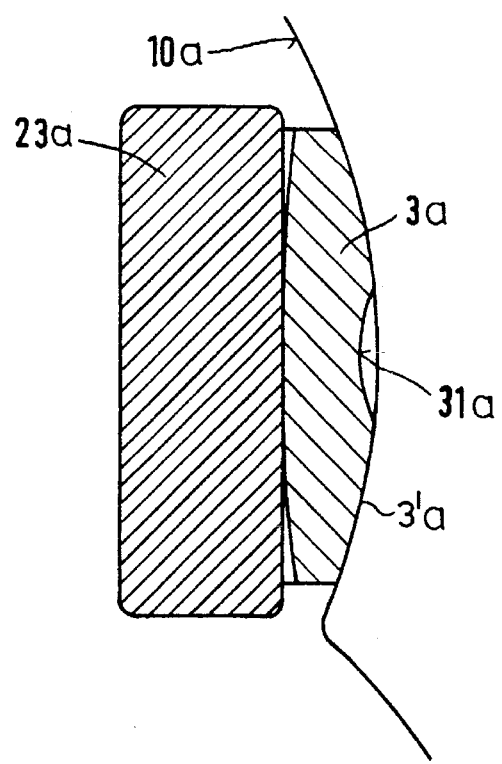
FIG. 3a is a large-scale view of a detail of FIG. 3.

FIGS. 3 and 3a show part of a second joint embodying the invention where parts functionally identical to parts in FIGS. 3 and 3a bear the same reference numerals with a postscript a. The inner member 2a is provided with three trunnions 21a, on each of which a respective cylindrical inner part or bush 23a is mounted to be rotatable by way of needle bearings 22a. A roller 3a with a part-spherical outer surface formed with a circumferential central noncontact strip or groove 31a is mounted to be rotatable by way of the bush 23a. In cross-section, the internal profile of the roller 3a is inwardly convexly crowned and the external profile of the bush 23a is cylindrical. The roller 3a is loaded by the circumferential force inwardly at one location in the region of the crown plane and outwardly at two locations spaced from the crown plane. Consequently, the force transmission is isostatic. An opposite arrangement is also possible, in which the external profile of the bush 23a is convexly crowned and the inner surface of the outer part 3a is cylindrical.

Figure 4:
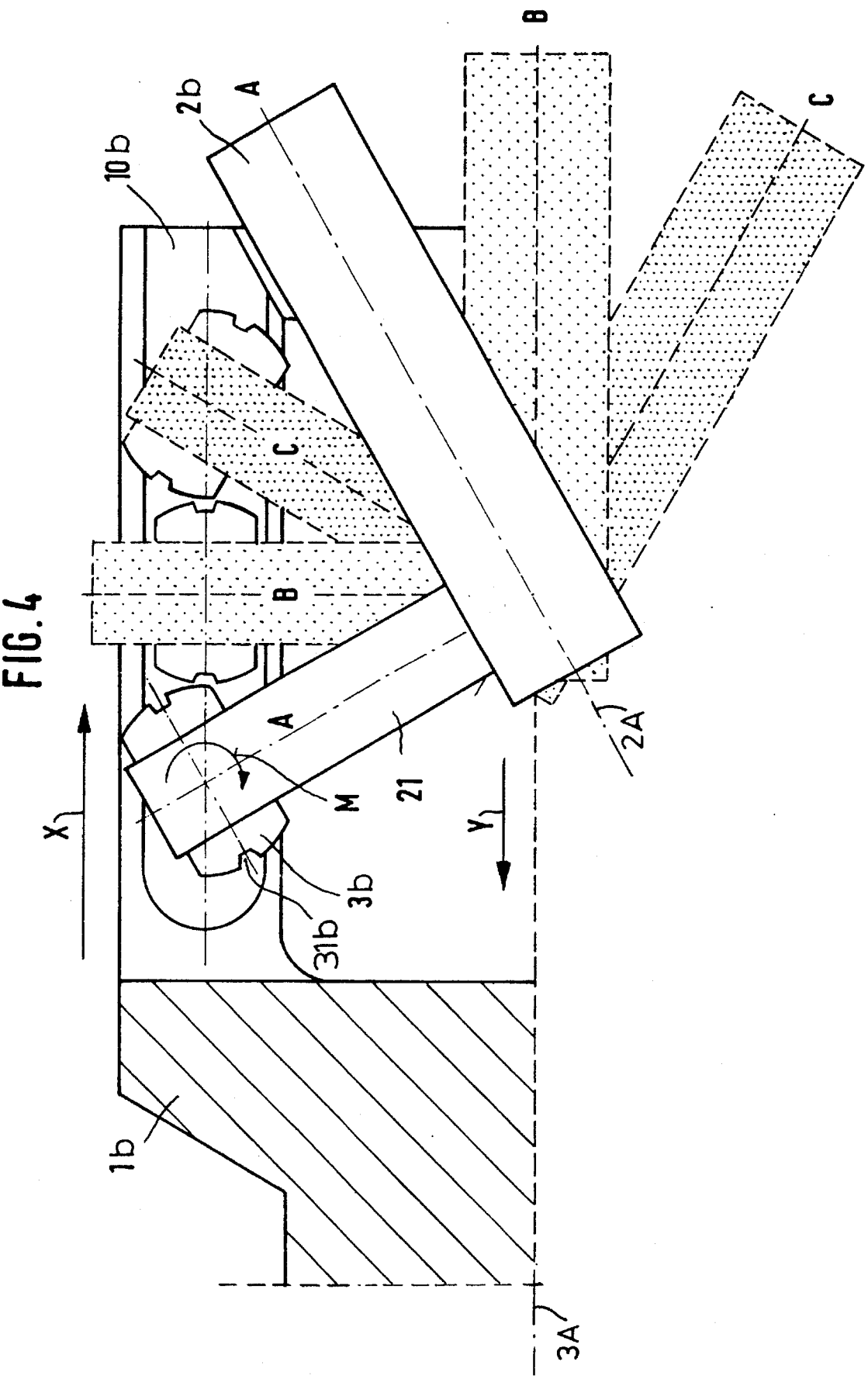
FIG. 4 is a side view illustrating operation of the joint of FIG. 2.

FIG. 4 illustrated the travel of a roller 3b along the associated track 10b under pivotal movement of its trunnion 21 when the joint is deflected during rotation thereof, that is when the inner member axis 2Ab and outer member axis 3Ab are not coaxial. The roller 3b moves from the position A by way of the position B to the position C and finally by way of B back to A. On movement in a direction X, the outer member 1b is subjected to a frictional force in this direction, the force being greater for increasing oblique setting or oblique angle of roller 3b relative to the track 10b. In that case, a pivotal movement of the roller 3b relative to the track 10b is executed in clockwise sense, whereby a friction moment M acting on the outer member is produced. This moment M causes an axial force which acts on the axis of the outer member in a direction Y, thus opposite to the direction X. A reduction in the axial forces is thus achievable by an increase in the moment M. The friction between the roller 3b and the trunnion 21b also acts on the outer member with a friction component in the direction X.

In the joint of FIG. 3, the roller 3a is pivotable slightly relative to the bush 23a, so that the pivotal movement of the roller 3a relative to its track 10a is correspondingly reduced. As a result, the track friction force is reduced along with the shaking force as well as the heavy movability of the joint.

Figure 5:
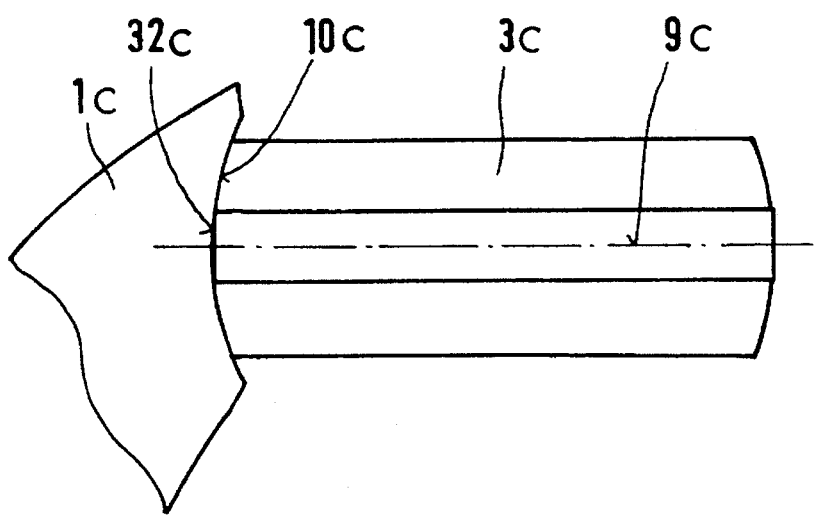
FIGS. 5 and 5a are views like respective FIGS. 1 and 1a showing another system according to the invention.
Figure 5A:
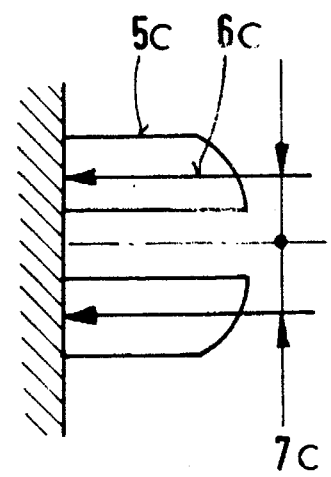

In FIG. 5 where parts functionally identical to parts in other embodiments bear the same reference numerals with a postscript c, there is shown part of a third joint embodying the invention, comprising a part-spherical roller 3c which is provided with a central cylindrical flat 32c, and a part-cylindrical track 10c. FIG. 5a shows the distribution of the surface pressure 5c of the couple of FIG. 5 wherein the loading in the central zone, thus the region of the flat 32c, is avoided. The effective radius 7c of the effective forces 6c and thus the friction moment are thereby increased. A reduction in the periodic axial force is reduced in correspondence with the width of the flat 32c, but line contact is maintained. If the roller 3c itself is constructed to be wider, the effective radius 6c can increase further, while the surface pressure is reduced.

Figure 6:
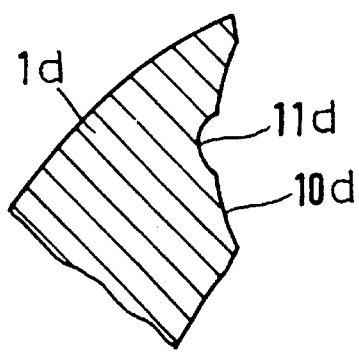
FIG. 6 is an axial section through another track according to the invention.
Figure 6A:
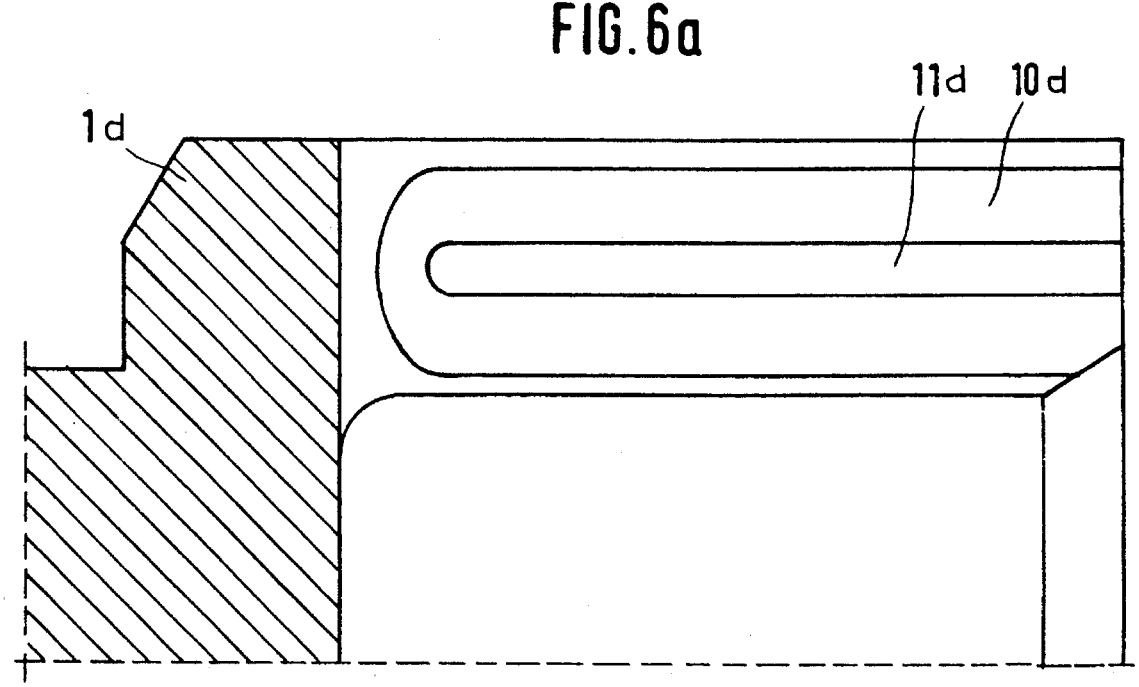
FIG. 6a is a side view of the system of FIG. 6.

FIG. 6 and 6a where parts functionally identical to parts in other embodiments bear the same reference numerals with a postscript d, show part of a fourth joint embodying the invention and comprising a part-cylindrical track 10d with a longitudinal groove 11d which influences the friction moment in a manner similar to the circumferential groove 31 in the roller 3 of FIG. 2. The groove 11d can be produced in the same operation and thus at favorable costs with a high accuracy during molding of the outer member 1d.

The depth of the roller circumferential groove 31 shown in FIG. 2 is generously dimensioned in order to compensate for any deformation of the roller 3 to fit the track 10 due to load and wear of the loaded surfaces. The groove 31 also has steep flanks which ensure a relatively constant width of the groove and thus a constant friction moment even in the case of greater radial eccentricities between the groove and the loaded outer surface of the roller. Such eccentricities mainly result from the method of manufacture, for example when the groove 31 is cut during turning and before hardening or the loaded outer surface is ground after hardening. Transition radii or chamfers between the flanks and the loaded outer surfaces are desirable.

The flattening by contrast, requires less radial space and has gentler transitions or flatter angles to the loaded outer surface of the roller and can be produced more simply and accurately, for example by grinding, at the same time the outer surface itself is produced.

Figure 7:
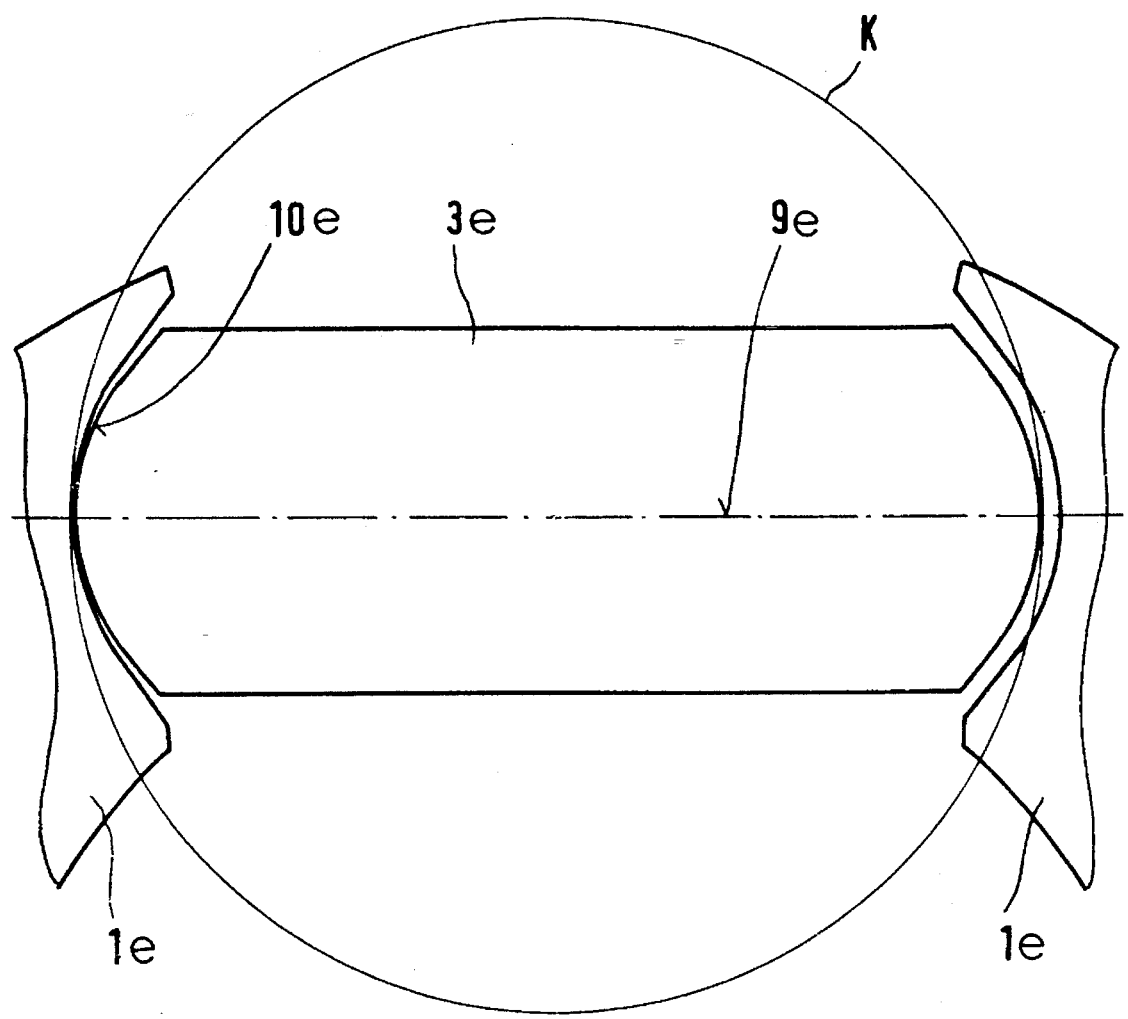
FIG. 7 is a mainly diagrammatic end view of yet another system according to the invention.

FIG. 7 where parts functionally identical to parts in other embodiments bear the same reference numerals with a postscript e, shows part of a fifth joint embodying the invention, comprising a part-elliptical roller 3e with a matched track 10e. When the roller is not situated in an oblique setting, the distribution of its surface pressure would be similar to that shown in FIG. 1a, or, if a flat were to be provided, similar to that shown in FIG. 5a. However, with increasing oblique setting, the effective radius can in both cases move for a higher friction moment. Thus here each outer running surface 10e is of a radius of curvature that is smaller than a radial distance between the outer running surface 10e and the respective trunnion axis.

It is advantageous in the embodiment without a flat that the greatest surface pressure for small angles or deflection of the joint or small oblique settings predominantly occurs in the region of the crown plane, so that friction losses can be minimized. The bore friction is then correspondingly low. This in itself is less relevant, since the periodic axial force, which to a first approximation is linearly dependent on the angle of deflection, in any case remains small for small angles of deflection.

Otherwise, the oblique setting of the roller, as apparent from FIG. 4, is variable between a maximum at the point of reversal and zero at the center of the stroke. Thus, where the sliding friction is the highest, the bore friction or its effective radius is correspondingly high and where no or only a small sliding friction component occurs, the bore friction is minimized. Accordingly, the periodic axial force as well as the efficiency and thus the smooth-running properties of the joint are optimized.

The profile of the tracks and/or the rollers can be formed in any desired manner within the scope of the invention as defined in the appended claims. It is important that an increase in the effective radius 7 occurs, preferably gradually, on inclination of the roller. In this case, a concave roller, which cooperates with a convex track, can also be used.

I claim:

1. In a constant-velocity joint comprising:

an outer member formed centered on an axis with three radially inwardly open and axially extending channels each having a pair of angularly confronting and substantially axially extending inner running surfaces that are each concave toward the other inner running surface of the respective pair;

an inner member formed centered on a respective axis generally coaxial with the outer member axis with three trunnions projecting radially outward of the inner member axis and each engaged in a respective one of the channels and defining and centered on respective trunnion axes extending substantially radially of the inner member axis; and respective annular rollers rotatable on the trunnions about the respective trunnion axes and slidable on the trunnions along the respective trunnion axes and having outer running surfaces riding on the inner running surfaces of the respective channels and each radially outwardly convex relative to the respective trunnion axis, the improvement wherein one of the inner running surfaces and of the outer running surfaces is formed with a central noncontact strip offset away from the other respective running surface;

the outer and inner running surfaces engage each other in line contact to either side of the noncontact strip;

the outer running surfaces are each of a radius of curvature at most equal to a radius of curvature of the respective inner running surfaces; and each of the rollers is formed at the respective outer running surface as a single unitary piece.

2. The constant-velocity joint defined in claim 1 wherein the outer running surfaces are part spherical, whereby the radius of curvature of the inner running surfaces is at least equal to the radius of curvature of the respective outer running surface.

3. The constant-velocity joint defined in claim 1 wherein each noncontact strip has a dimension measured axially relative to the respective trunnion axis equal generally to about one-third of a dimension of the outer running surfaces measured parallel to the respective trunnion axis.

4. The constant-velocity joint defined in claim 1 wherein each outer running surface is formed with the noncontact strip.

5. The constant-velocity joint comprising:

an outer member formed centered on an axis with three radially inwardly open and axially extending channels each having a pair of angularly confronting and substantially axially extending inner running surfaces that are each concave toward the other inner running surface of the respective pair;

an inner member formed centered on a respective axis generally coaxial with the outer member axis with three trunnions projecting radially outwardly of the inner member axis and each engaged in a respective one of the channels and defining and centered on respective trunnion axes extending substantially radially of the inner member axis; and respective annular rollers rotatable on the trunnions about the respective trunnion axes and each including an inner part rotatable and fixed on the respective trunnion against movement thereon along the respective trunnion axis and an outer part having an outer surface forming a respective outer running surface riding on and pivoting relative to the inner running surface of the respective channel on deflection of the inner-member axis relative to the outer member axis and radially outwardly convex relative to the respective trunnion axis and a respective inner surface engaging and slidable along the trunnion axis on the respective inner part axially relative to the respective trunnion axis, one of the inner running surfaces and of the outer running surfaces being formed with a central noncontact strip offset away from the other respective running surface;

the outer and inner running surfaces engaging each other in line contact to either side of the noncontact strip;

the outer running surfaces each being of a radius of curvature at most equal to a radius of curvature of the respective inner running surfaces; and each of the outer parts being formed at the respective outer surface as a single unitary piece.

6. The constant-velocity joint defined in claim 5 wherein the inner surface of each outer part is convex radially inwardly of the respective trunnion axis, whereby the outer parts can rock limitedly on the respective inner parts.

\* \* \* \* \*